United States Patent
Held et al.

(10) Patent No.: US 9,948,088 B2
(45) Date of Patent: Apr. 17, 2018

(54) APPARATUS AND METHOD FOR PROTECTING A CIRCUIT OF A VEHICLE AND CIRCUIT

(71) Applicant: ZF Friedrichshafen AG, Friedrichshafen (DE)

(72) Inventors: Matthias Held, Schnabelwaid (DE); Hans Hanft, Pegnitz (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 637 days.

(21) Appl. No.: 14/381,713

(22) PCT Filed: Jan. 10, 2013

(86) PCT No.: PCT/EP2013/050362
§ 371 (c)(1),
(2) Date: Jan. 21, 2015

(87) PCT Pub. No.: WO2013/127550
PCT Pub. Date: Sep. 6, 2013

(65) Prior Publication Data
US 2015/0180219 A1    Jun. 25, 2015

(30) Foreign Application Priority Data
Feb. 29, 2012 (DE) .................. 10 2012 203 072

(51) Int. Cl.
*H02H 3/18*     (2006.01)
*H02H 11/00*    (2006.01)
*H02H 7/18*     (2006.01)

(52) U.S. Cl.
CPC ............ *H02H 3/18* (2013.01); *H02H 11/002* (2013.01); *H02H 7/18* (2013.01)

(58) Field of Classification Search
CPC ........... H02H 3/18; H02H 11/002; H02H 7/18
See application file for complete search history.

(56) References Cited

U.S. PATENT DOCUMENTS

| 5,075,813 | A | 12/1991 | Takabayashi | |
|---|---|---|---|---|
| 5,726,505 | A * | 3/1998 | Yamada | H02H 3/18 307/116 |
| 6,114,775 | A * | 9/2000 | Chung | B60K 6/46 180/65.245 |

(Continued)

FOREIGN PATENT DOCUMENTS

| EP | 0 685 916 A2 | 12/1995 | |
|---|---|---|---|
| GB | 1483766 | * 10/1974 | H02J 7/00 |

OTHER PUBLICATIONS

International Search Report dated Apr. 3, 2013 in International Application No. PCT/EP2013/050362 (2 pages).

(Continued)

*Primary Examiner* — Zeev V Kitov
(74) *Attorney, Agent, or Firm* — Brinks Gilson & Lione

(57) ABSTRACT

A device for protecting a circuit of a battery for a vehicle having an operating current direction, having a control device for providing a control signal, which represents a direction of the current flow through the circuit and a switching element that is designed to interrupt the circuit depending on the control signal in order to protect the circuit.

18 Claims, 3 Drawing Sheets

(56) References Cited

U.S. PATENT DOCUMENTS

| | | | |
|---|---|---|---|
| 7,642,747 B2 * | 1/2010 | Morioka | H01M 10/441 320/112 |
| 2006/0261751 A1 | 11/2006 | Okabe et al. | |
| 2007/0081285 A1 | 4/2007 | Takeshita et al. | |

OTHER PUBLICATIONS

International Search Report and Written Opinion from corresponding International Patent Application PCT/EP2013/050362, dated Apr. 3, 2013 (German Language) (9 pages).

* cited by examiner

APPARATUS AND METHOD FOR PROTECTING A CIRCUIT OF A VEHICLE AND CIRCUIT

This application is a filing under 35 U.S.C. § 371 of International Patent Application PCT/EP2013/050362, filed Jan. 10, 2013, and claims the priority of DE 10 2012 203 072.7, filed Feb. 29, 2012. These applications are incorporated by reference herein in their entirety.

The present invention relates to a device for protecting a circuit of a battery for a vehicle having an operating current direction, a corresponding method and a circuit for a vehicle.

Electrical consumers are protected in the vehicle with a safety fuse in order, in the case of a failure, to be able to switch off currents that are too high. In this connection, the fuse is designed for currents above the nominal current in order to prevent an accidental tripping. However, this is only feasible if the nominal currents are significantly lower than the maximum batter current.

Against this background, the present invention creates an improved device for protecting a circuit of a battery for a vehicle having an operating current direction in accordance with the main claims. Advantageous embodiments arise from the subsidiary claims and the subsequent description.

A circuit of a vehicle can be protected by means of an active fuse. Such an active fuse has the advantage that it can trip very rapidly and in the event of slight improper strain within the circuit.

If a vehicle battery (KFZ battery) is included in the circuit, protection of the KFZ battery from short circuits can occur with a corresponding fuse. In contrast to the safe fuse, which, in the event of nominal currents in the magnitude of the maximum battery current of the KFZ battery would not trip until relatively late, the active fuse can trigger early. The early triggering can prevent the battery voltage of the KFZ battery from dropping. A drop in the battery voltage can in the worst case lead to the breakdown of control devices and should therefore be avoided.

Through the active fuse consumers can also be securely switched off that can even generate a current in the magnitude of the battery nominal current. A short-circuit current can be switched off as soon as the short circuit occurs. Thus it is possible to prevent a negative current from building up. As a result a secure operation, for example of a vehicle, is ensured.

A device for protecting a circuit of a battery for a vehicle having an operating current direction has the following features:

a control device for providing a control signal, which represents a direction of the current flow through the circuit and a switching element that is designed to interrupt the circuit depending on the control signal in order to protect the circuit.

The vehicle can be a motor vehicle. The vehicle can have an internal combustion engine, a hybrid drive or an electric drive. The battery can be a vehicle electrical system battery or an electrical vehicle battery. The battery can be a low voltage or high voltage battery. The battery can be considered as representative of an electrical energy storage unit. The circuit can comprise a plurality of electrically conductive connecting cables and electrical or electronic components. For example, the circuit can comprise a consumer or an electrical generator. The current flow can designate an electrical current flowing through the circuit or through at least a line section of the circuit. The control device can comprise a measuring device or a sensor device for recording the direction of the current flow. For example, the control device can be designed to inductively record the direction of the current flow. To this end, the control device can have a spool that is part of the circuit or is coupled to the circuit. The control signal can be an electrical signal. For example, the control signal can comprise a control current or a control voltage. The control device can be an electrical circuit, for example, an amplifier circuit for providing the control signal. The control device can be designed to set a value or a quantity of the control signal depending on the direction of the current flow. The control device can be designed to output the control signal to the switching element. The switching element can have the functionality of a switch inserted into the line of the circuit. An electrical, electronic or electromechanical component can be used as the switching element. In a conducting state of the switching element the current flow can take place through the switching element and hence through the circuit. In a non-conducting state of the switching element the current flow through the switching element can be locked and thus the circuit can be interrupted. The control signal can be designed to put the switching element in a conducting or non-conducting state. The switching element can be designed make the current flow possible through the switching element and thus, through the circuit at least in limited fashion in the event of a non-present control signal or a control signal not actively output from the control device, for example if the current sensor is inactive or during a commissioning process of the circuit. More than one switching element can also be provided, each of which can be selected from the control device by means of the control signal. The control device can, in combination with the switching element or the switching elements, constitute an active fuse for the circuit or for at least an element incorporated in the circuit, for example the battery or a switching element. The active fuse can be used in addition to or as an alternative to an overcurrent fuse, for example a safety fuse. The operating current direction can be a current direction of a current flowing through the circuit in a normal operation of the circuit. The circuit can be interrupted by the active circuit if the current direction determined by the control device differs from the operating current direction. Such a deviation can occur, for example, due to a short circuit or a defect within the circuit.

For example, the control device can be designed to provide a first control signal if the direction of the current flow corresponds to the operating current flow of the circuit and provide a second control signal if the direction of the current flow opposes the operating current flow. In the process, the switching element can be designed to interrupt the circuit correspondingly to the second control signal. The switching element can be designed to respond to the first control signal in order to release the circuit. For example, the switching element can be designed to lower an internal resistance of an electrical connection through the switching element in response to the first control signal. The first and second control signals can differ from one another by a value or quantity of the control signal. For example, the first control signal can represent a first voltage and the second control signal can represent a second voltage differing from the first voltage.

Thus the control device can be designed to provide the control signal as a control voltage for the switching element. A control voltage is, for example suitable for selecting a switching element in the form of a transistor.

The operating current direction can correspond to a charging current direction for the charging of a battery. To this end, the circuit can have a battery and a generator for providing a charging current or a charging voltage for charging the battery as well as having lines that connect the battery to the generator. In the operation of the circuit the charging current direction can be predefined by a charging current generated by the generator. If a short circuit occurs on the circuit or if the generator is for example defective, the current direction within the circuit can reverse due to the battery voltage provided by the battery. Such a current direction opposing the operating current direction can be detected in the use of the control device and lead to interruption of the circuit by the switching element. By being able to rapidly detect a reverse in the current direction, damage of the battery can be effectively prevented.

According to one embodiment, the switching element can comprise at least one transistor. The control device can be designed to provide the control signal to a control input of the at least one transistor. If the switching element has two or a plurality of transistors, they can be arranged in a parallel circuit. Also, at least two of the transistors can be arranged in series at different positions in the circuit. If the switching element has several transistors, the control device can be designed to provide the control signal for selection of the several transistors to the several transistors. A transistor lends itself as a switching element because it can be realized cost-effectively, has a low power loss and is reliable.

For example, the transistor can be a field-effect transistor. In particular, the transistor can be a metal oxide semiconductor field-effect transistor. In the process, a diode can be connected conductively between the source terminal and drain terminal of the field-effect transistor with respect to the operating current direction. The diode can be a so-called body diode of the field-effect transistor. Through the control signal an internal resistance of the field-effect transistor between the source terminal and drain terminal and thus a current flow through the field-effect transistor can be controlled. The field-effect transistor can be designed as a normal locking transistor. If the control signal represents a control voltage that is less than the threshold voltage, the field-effect transistor can lock and thus interrupt the circuit. If there is no control signal at the field-effect transistor, a current flow through the diode of the field-effect transistor can take place in the operating current direction.

According to one embodiment, the device can comprise an overcurrent protection device that is designed to interrupt the circuit depending on a quantity of the current flow. The overcurrent protection device can be arranged in series to the control device and the switching element in the circuit. The circuit can be interrupted through the overcurrent protection device if the current flow reaches or exceeds a pre-determined maximum value. In the process, the overcurrent protection device can trip regardless of the direction of the current flow. For example, the overcurrent protection device can be a safety fuse. As an alternative, it can be an electromechanical component. The overcurrent protection device can, for example respond in the event of reverse polarity of the battery.

In the process, the device can have a further control device that is designed to provide a further control signal. The further control signal can represent a polarity of a voltage of the battery. The switching element can be designed to make the current flow possible through the switching element depending on the further control signal. The further control signal can be combined with the control signal of the control device, for example added. In this way the switching element can be selected both by the control device as well as also by the further control device and can be switched to the conducting state. By having the switching element switched conductively in the event of a reverse polarity of the battery, damage to the switching element can be prevented.

A circuit for a Vehicle has the Following Features:

a first terminal for connection of a first contact of the battery and a second terminal for connection of a second contact of the battery;

a charging device for charging the battery, wherein a charging current direction for charging the battery corresponds to an operating current direction of the circuit; and a device according to any one of the preceding claims for protecting the circuit.

The contacts of the battery can be a positive pole and a negative pole of the battery. The charging device can be connected by lines of the circuit to the first terminal and the second terminal. The charging device can be a generator, for example a generator of the vehicle.

The circuit can comprise the battery, which is connected between the first terminal and the second terminal. The battery can close the previously opened circuit. One or more consumers of the vehicle can be supplied with electrical power from the battery via an additional circuit connected to the battery. The charging device and the battery can be interconnected through the circuit such that the battery is charged by the charging device in normal operation of the circuit. In the process, a charging current flows in the operating current direction through the circuit.

A method for protecting a circuit of a battery for a vehicle having an operating current direction comprises the following steps:

Recording a direction of a current flow through the circuit; provision of a control signal that represents the direction of the current flow; and interruption or closing of the circuit depending on the control signal in order to protect the circuit.

The steps of the method can be implemented by suitable devices, for example a device for protecting a circuit for a battery of a vehicle having an operating current direction. For example, the device can be an electrical device that generates a sensor signal, processes it and in dependency on it generates a control signal and uses it to carry out a switching function. The device can have one or more suitable interfaces. The interfaces can be part of an integrated circuit or consist at least partially of discrete components.

The invention will be explained in greater detail with the help of the attached drawings. The figures show the following:

In the subsequent description preferred exemplary embodiments of the present invention the same or similar reference numerals are used for the elements shown and acting similarly in the various figures, wherein a repeated description is dispensed with.

Figure 1:
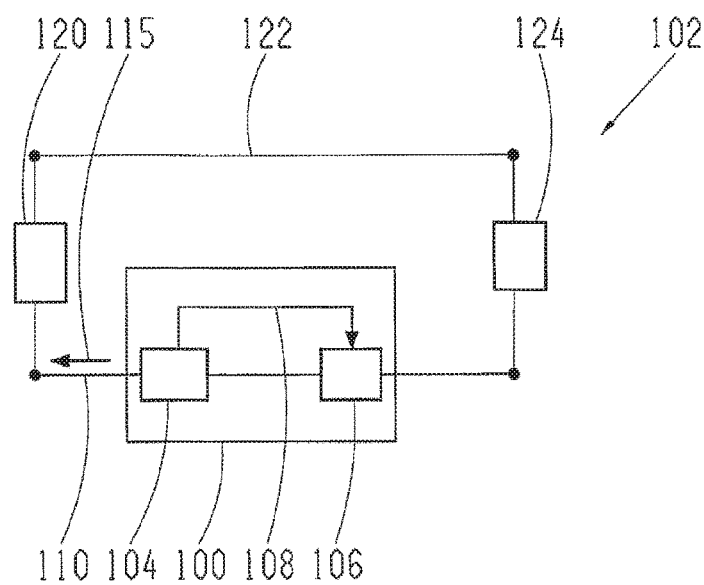
FIG. 1 shows a schematic representation of a device for protecting a circuit according to an embodiment of the present invention.

FIG. 1 shows a schematic representation of a device 100 for protecting a circuit 102 in accordance with an exemplary embodiment of the present invention. The device 100 has a control device 104 and a switching element 106. The control device 104 is designed to generate a control signal 108 and provide said control signal to a control input of the switching element 106 via an electrical line. In accordance with this exemplary embodiment the device 100 is coupled to a first line 110 of the circuit 102 or arranged in the first line 110.

The control device 104 is designed to record a direction of the current flow 115 through the first line 110 of the circuit. The control device 104 is further designed to generate the control signal 108 depending on the recorded direction of the current flow 115. In this way, the direction of the current flow 115 is represented by the control signal 108 or by a value of the control signal 108.

The switching element 106 is designed to interrupt or facilitate the current flow 115 through the first line 110 depending on the control signal 108. To this end, the switching element 106 can be arranged in the first line 110 so that the control flow 115 occurs via the switching element 106 when the switching element 106 is in a conducting state. If the switching element 106 is in a locking state no current flow 115 is possible through the switching element 106 and thus through the first line 110. By means of the control signal 108 the switching element 106 can be switched from the locking state to the conducting state and vice versa. If there is no active control signal 108 provided by the control device at the control input of the switching element 106, the switching element 106 can be in a restricted conducting state. In the restricted conducting state the current flow 115 through the switching element 106 and thus, through the first line 110 is possible, however; the switching element 106 has a greater internal resistance in the restricted conducting state with reference to the current flow 115 than in the conducting state, into which the switching element 106 can be moved by a corresponding control signal 108.

In the commissioning of the device 100 and the circuit 102 the switching element 106 can be in the restricted conducting state. In a normal operating mode of the circuit 102, in which the current flow 115 takes place in an operating current direction, the switching element 106 can be in the conducting state. In the event of an error within the circuit 102, on the basis of which the current flow 115 takes place against the operating current direction, the switching element can be moved to the locking state.

The circuit 102 has a generator 120 in addition to the first line 110, a second line 122 and an energy storage unit 124, for example an electrochemical energy storage unit in the form of a battery or an accumulator. For example, the energy storage unit 124 can be a motor vehicle battery and the generator 120 can be a charging device, for example in the form of a generator of a vehicle. The first line 110, the generator 120, the second line 122 and the energy storage unit 124 are connected to one another in a series circuit and form a closed circuit. In the normal operating mode the generator 120 is designed to generate the current flow 115 in the operating current direction for charging the energy storage unit 124. As an alternative to the generator 120 the circuit can also have a consumer.

Figure 2:
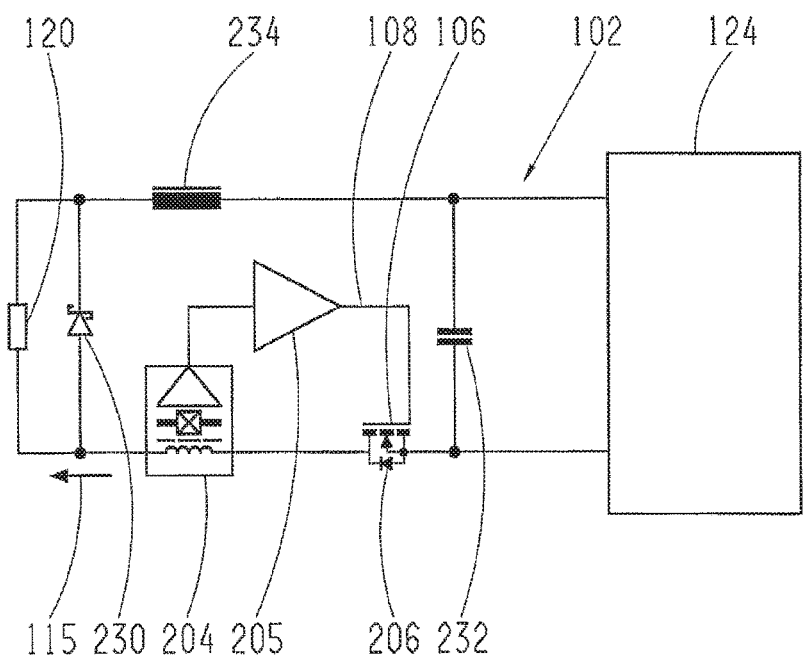
FIGS. 2 and 3 show representations of circuits in accordance with exemplary embodiments of the present invention.

FIG. 2 shows a circuit 102 in accordance with an exemplary embodiment of the present invention. The circuit 102 can be the circuit 102 described with the help of FIG. 1 with a battery 124 and a generator 120. The circuit 102 has a device for protecting the circuit 102.

The device for protecting the circuit 102 has a control device with a current sensor 204 and an amplification device 205 and a switching device in the form of a transistor 106 with a body diode 206. In accordance with this exemplar embodiment, the transistor is designed as a normal locking n-channel metal oxide semiconductor field-effect transistor (MOSFET). The current sensor 204 is designed to record a direction of a current flow 115 within the circuit 102 and to output a direction signal corresponding to the direction to the amplification device 205. The amplification device 205, in accordance with this exemplary embodiment designed as a gate driver, is designed to amplify the direction signal and output it as a control signal 108 to the gate terminal of the transistor 106. The anode of the body diode 206 of the transistor 106 is connected to the source terminal of the transistor 106 and the cathode of the body diode 206 is connected to the drain terminal of the transistor 106. The source terminal of the transistor 106 is connected to a contact of the battery 124. The drain terminal of the transistor 106 is connected to a terminal of the generator 120 via the current sensor 204.

The current sensor 204 can have an inductance which can be part of the circuit 102 or can be inductively coupled to a line of the circuit 102. A magnetic field generated by the inductance or recorded by inductance can be used by the current sensor 204 to record the direction of the current flow 115 through the circuit. The current sensor 204 can have an amplifier for the output of the direction signal dependent on the magnetic field.

In the case of a first direction of the current flow 115, which exists during a normal operation of the circuit 102 and is also designated as operating current direction or positive current, the control signal 108 is provided such that the transistor 106 is conducting. In the case of a second direction of the current flow 115 opposing the first direction, which for example exists in the case of a short circuit and is also designated as negative current, the control signal 108 is provided such that the transistor 106 and the body diode 206 lock.

In accordance with this exemplary embodiment, a Schottky diode 230 is parallel connected to the generator 120. The anode of the Schottky diode 230 is connected to a first terminal of the generator 120 and the cathode of the Schottky diode 230 is connected to a second terminal of the generator 120. A capacitor 232 is parallel connected to the battery 124. The capacitor 232 can be an intermediate circuit capacitor. The first terminal of the generator 120 is connected via the current sensor 204 and the transistor 106 to a first contact of the battery 124. The second terminal of the generator 120 is connected via an inductance 234 to a second contact of the battery 124.

In accordance with one exemplary embodiment, a switching element 106 is connected in series to the generator 120 as an active fuse of the circuit 102. In accordance with this exemplary embodiment, the switching element 106 is a MOSFET 106, or several parallel MOSFETs. To this end, the body diode 206 of the MOSFETs 106 points in the operating current direction, thus the direction of the normal current flow 115 during a normal operation of the circuit 102. To reduce the losses the MOSFET 106 is switched in the event of currents in the operating current direction, thus in the case of positive currents, as a result of which the current flows completely over the MOSFET 106. In the case of negative currents the MOSFET 106 is switched off and the diode 206 is also locked. In this context, a positive current is a current flow 115 suitable for charging the battery 124, said current flow flowing during the normal operation of the circuit 102. In normal operation the generator 120 is used as a charging device for the battery 124. In this context, a negative current is a current flow 115 with a direction opposite the positive current. For example, a negative current can flow in the event of a short circuit.

A current sensor signal is used to select the MOSFET 106, said signal outputting the current value for the current. The information thus obtained about the current is directly or indirectly converted into a gate control signal in the form of the control signal 108 for the MOSFET 106. As a result, it is possible to switch off the short circuit current before it exceeds a critical value.

Thus, in accordance with this exemplary embodiment, a combination of current sensor 204 and MOSFET 106 is employed for switching off high currents.

Figure 3:
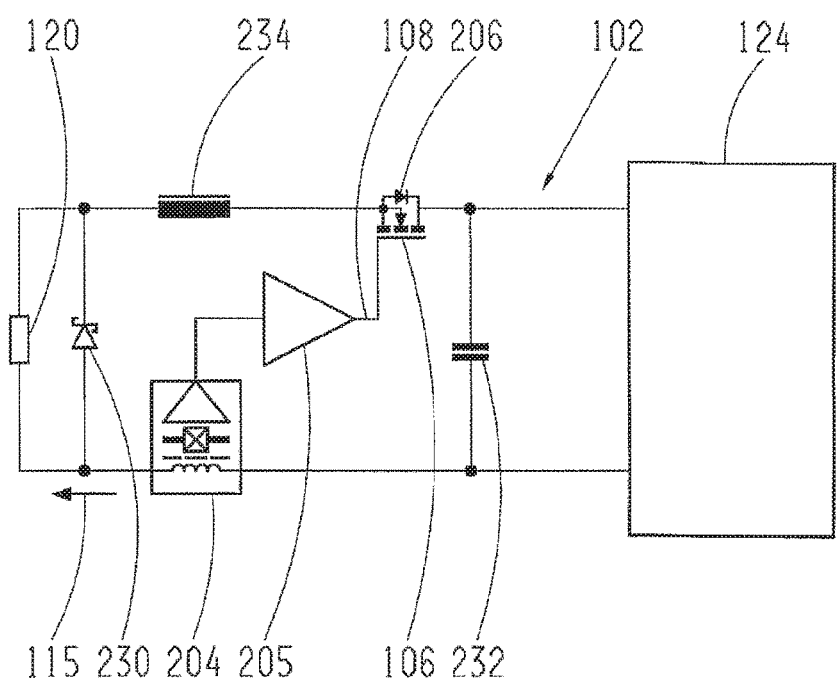

FIG. 3 shows a circuit 102 in accordance with a further exemplary embodiment of the present invention. The circuit 102 can be the circuit 102 described with the help of FIG. 2, with the difference that the transistor 106 is arranged at a different position of the circuit 102. In accordance with the exemplary embodiment shown in FIG. 3 the source terminal of the transistor 106 is connected via the inductance 134 to the second terminal of the generator 120 and the drain terminal of the transistor 106 is connected to the second terminal of the battery 124.

Figure 4:
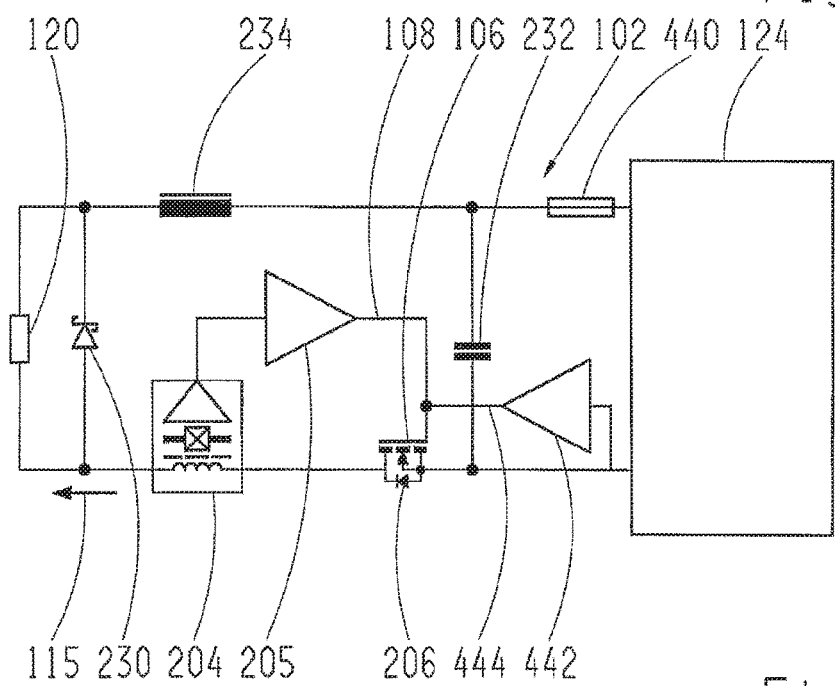
FIGS. 4 and 5 show representations of circuits in accordance with further exemplary embodiments of the present invention.

FIG. 4 shows a circuit 102 in accordance with a further exemplary embodiment of the present invention. The circuit 102 can be the circuit 102 described with the help of FIG. 2, with the difference that the device for protecting the circuit 102 additionally has an overcurrent protection device 440 and optionally also a further control unit 442.

The overcurrent protection device 440 can be arranged at a suitable position in the circuit 102. In accordance with this exemplary embodiment, the overcurrent protection device 440 is connected between the second contact of the battery 124 and a node to terminals of the inductance 234 and the capacitor 232. Thus, the overcurrent protection device 440 is directly electrically conductively connected via an electrical line to the second contact of the battery 124. In accordance with this exemplary embodiment, the overcurrent protection device 440 is designed as a safety fuse.

The overcurrent protection device 440 is designed as a fuse to interrupt the current flow 115 within the circuit 124 and in particular the current flow 115 through the battery 124, when the current flow 115 exceeds a predetermined current intensity, for example the maximum battery current of the battery 124. For example, the predetermined current intensity can be exceeded when the battery 124 is connected to the circuit in reverse polarity, thus the first contact and the second contact of the battery 124 are transposed. If the overcurrent protection device 440 did not interrupt the current flow 115 in this case, the battery current of the battery 124 would flow through the body diode 206 of the transistor 106 and the Schottky diode 230. This could lead to damage of the battery 124 and under circumstances to damage of further elements of the circuit 102.

In order to prevent damage to the transistor 106 in the case of reverse polarity of the battery 124, the further control device 442 can be provided as an option. The further control device 442 is designed to provide a further control signal 444 to the transistor 106 dependent on the wiring of the battery 142. The further control device 442 is designed to provide the further control signal 444 such that the further control signal 444 moves the transistor 106 into the conducting state when the battery 142 is arranged incorrectly poled in the circuit 102. In accordance with this exemplary embodiment, the further control device 442 is designed in the form of an amplifier acting as a gate driver. An input of the further control device 442 is connected to a line section of the circuit 102 provided for bonding of the first contact of the battery 142. An output of the further control device 442 is connected to the gate terminal of the transistor 106.

In accordance with the exemplary embodiment shown in FIG. 4, since, in the case of a reverse polarity of the battery voltage of the battery 142, e.g. in the event of an exchange of the battery 142, the diode 206 of the MOSFET 106 is conducting, an additional safety fuse 440 is provided for this case. In order, in this connection to protect the MOSFET 106, it is practical to actively switch on the MOSFET 106 in the case of the reverse polarity of the battery voltage. This reduces the voltage drop over the diode 206 of the MOSFET 106 significantly and thus, also lowers the losses at the MOSFET 106. This can be achieved via the further control device 442, e.g. in the form of a separate power supply 442 that provides required voltage in the form of the further control signal 444 for switching on the MOSFET 106, in particular in the case of the reverse polarity. The separate power supply 442 can be supplied with energy via the reverse polarized battery voltage of the battery 124.

Thus, in accordance with this exemplary embodiment, a selection of the MOSFET 106 occurs in the case of reverse polarity through a second power supply 442 or a second gate driver 442.

Figure 5:
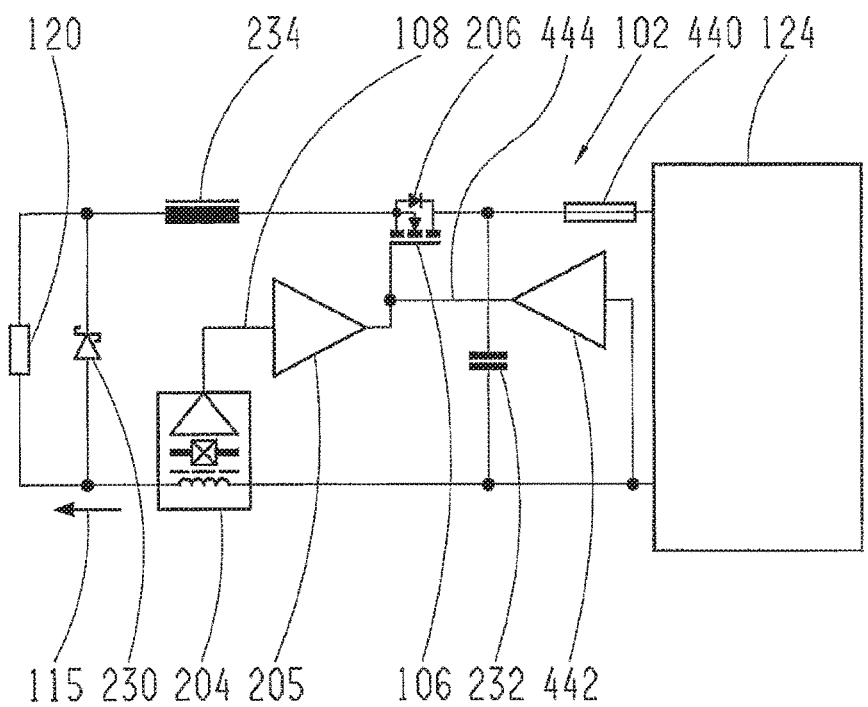

FIG. 5 shows a circuit 102 in accordance with a further exemplary embodiment of the present invention. The circuit 102 can be the circuit 102 described with the help of FIG. 4, with the difference that the transistor 106 is arranged at a different position of the circuit 102. In accordance with the exemplary embodiment shown in FIG. 5, the source terminal of the transistor 106 is connected to the second terminal of the generator 120 via the inductance 134 and the drain terminal of the transistor 106 is connected to the second contact of the battery 124 via the overcurrent protection device 440.

Figure 6:
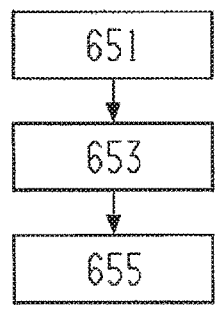
FIG. 6 shows a flow chart of a method for protecting a circuit in accordance with an exemplary embodiment of the present invention.

FIG. 6 shows a flow chart of a method for protecting a circuit of a battery for a vehicle having an operating current direction in accordance with an exemplary embodiment of the present invention. The method can, for example be carried out by a device for protecting a circuit, as described with the help of the preceding figures. In a step 651 a direction of a current flow is recorded by the circuit. In response to this, in a step 653 a control signal is generated and provided that represents the direction of the current flow. In a step 655, depending on the control signal the circuit is either interrupted or closed, in order to protect the circuit.

The exemplary embodiments described and shown in the figures are only selected as examples. Different exemplary embodiments can be combined with one another completely or with respect to single features. Also, an exemplary embodiment can be supplemented by the features of a further exemplary embodiment. Further, inventive steps of the method can be repeated as well as executed in an order differing from the described order.

REFERENCE LIST

100 Device
102 Circuit
104 Control device
106 Switching element
108 Control signal
110 First line
115 Current flow
120 Generator
122 Second line
124 Energy storage unit
204 Current sensor 206 Body diode
230 Schottky diode
232 Capacitor
234 Inductance
440 Overcurrent protection device
442 Further control device
444 Further control signal
651 Step of recording
653 Step of providing
655 Step of interrupting or closing

The invention claimed is:

1. A device for protecting a circuit of a battery for a vehicle, the device comprising:
   a control device configured to provide a control signal, where the control signal represents a direction of the current flow through the circuit representing an operating current direction;
   a switching element configured to interrupt the circuit depending on a direction of the control signal in order to protect the circuit;
   an overcurrent protection device configured to interrupt the circuit depending on a quantity of the current flow through the battery; and
   a second control device configured to provide a second control signal when the battery has a reverse polarity with respect to a default polarity, wherein the second control signal causes the switching element to enter a conducting state when the battery has the reverse polarity.

2. The device according to claim 1, where the switching element is configured to interrupt the control signal when the control signal represents that the direction of the current flow opposes the operating current direction.

3. The device according to claim 1, where the operating current direction corresponds to a charging current direction for charging the battery.

4. The device according to claim 1, where the switching element comprises a transistor and the control device is configured to provide the control signal to a control input of the transistor.

5. The device according to claim 4, where the transistor is a field-effect transistor, the device further comprising:
   a diode is connected conductively between a source terminal and a drain terminal of the field-effect transistor with respect to the operating current direction.

6. The device according to claim 1, wherein the overcurrent protection device includes a fuse.

7. The device claim 1, wherein the switching element includes a transistor, wherein the second control device is connected to a gate of the transistor, and wherein the second control signal causes the transistor to enter the conducting state when the battery has the reverse polarity.

8. A circuit for a vehicle, the circuit comprising:
   a first and second terminal configured to connect to corresponding terminals of a battery;
   a charging device connected to the first terminal and second terminal and configured to charge the battery, wherein an operating current direction of the circuit corresponds to a charging current direction for charging the battery; and
   a device configured to protect the circuit, the device comprising:
   a control device configured to provide a control signal, where the control signal represents a direction of the current flow through the circuit;
   a switching element configured to interrupt the circuit depending on the control signal;
   an overcurrent protection device configured to interrupt the circuit depending on a quantity of the current flow through the battery; and
   a second control device configured to provide a second control signal when the battery has a reverse polarity with respect to a default polarity, wherein the second control signal causes the switching element to enter a conducting state when the battery has the reverse polarity.

9. A circuit according to claim 8, where the battery that is connected between the first terminal and the second terminal.

10. A method for protecting a circuit of a battery for a vehicle, the circuit having an operating current direction, the method comprising the following steps:
    determining whether a direction of a current flow through the circuit is in a default polarity or a reverse polarity; and
    controlling the circuit depending on a control signal, where the control signal represents the determined direction of the current flow through the circuit, and wherein controlling the circuit includes providing the control signal to a control device when the battery has the reverse polarity such that the control device causes a switching element to enter a conducting state.

11. The method according to claim 10, where controlling the circuit comprises:
    interrupting the circuit depending on the control signal; and
    opening the circuit depending on the control signal.

12. The circuit according to claim 8, where the switching element is configured to interrupt the circuit when the control signal represents that the direction of the current flow opposes the operating current direction.

13. The circuit according to claim 8, where the operating current direction corresponds to a charging current direction for charging the battery.

14. The circuit according to claim 8, where the switching element comprises a transistor and the control device is configured to provide the control signal to a control input of the transistor.

15. The circuit according to claim 14, where the transistor is a field-effect transistor, the device further comprising:
    a diode connected conductively between a source terminal and a drain terminal of the field-effect transistor with respect to the operating current direction.

16. The circuit according to claim 8, the circuit further comprising an overcurrent protection device configured to interrupt the circuit depending on a quantity of the current flow.

17. The circuit according to claim 8, wherein the switching element includes a transistor, wherein the second control device is connected to a gate of the transistor, and wherein the second control signal causes the transistor to enter the conducting state when the battery has the reverse polarity.

18. The circuit according to claim 17, where the switching element is configured to interrupt the circuit depending on the control signal and configured to open the circuit depending on the control signal.

* * * * *